Patented Aug. 12, 1924.

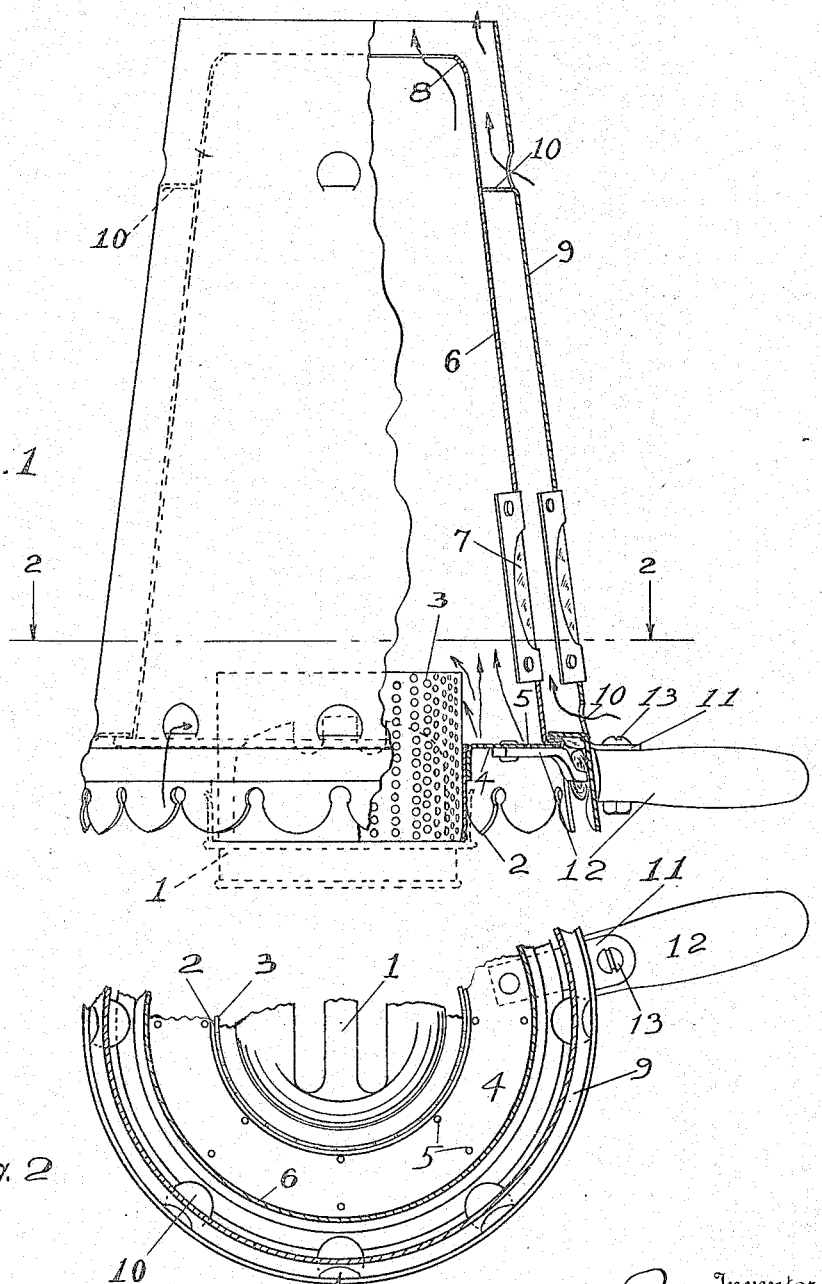

1,504,364

UNITED STATES PATENT OFFICE.

BRUNO MARTIN, OF SAGINAW, MICHIGAN.

HEATING ATTACHMENT FOR LAMPS.

Application filed October 10, 1923. Serial No. 667,779.

*To all whom it may concern:*

Be it known that I, BRUNO MARTIN, a citizen of the United States, residing at Saginaw, in the county of Saginaw and State of Michigan, have invented certain new and useful Improvements in Heating Attachments for Lamps; and I do hereby declare the following to be a full, clear, and exact description of the invention, such as will enable others skilled in the art to which it appertains to make and use the same.

This invention is a heating attachment for lamps and is adapted to be placed on an ordinary kerosene illuminating burner, to thereby convert it into an effective heating burner.

The objects of my improvement are to provide in the attachment means for increasing the efficiency of combustion and the amount of heat delivered, and to prevent formation of soot.

To attain these results my invention includes means for supplying additional oxygen to the lamp flame so that the flame will be changed from luminous to a nearly non-luminous heating flame and at the same time air currents that supply the oxygen will be prevented from distorting the shape of the flame or causing the flame to flicker or burn unevenly.

A further object is to construct the inner and outer walls of the heating device so they can be easily put together or separated.

My improvement also provides a spacing device for said walls whereby the space between them is utilized for heated air circulation.

With the foregoing and certain other objects in view which will appear later in the specifications my invention comprises the devices described and claimed and the equivalents thereof.

In the drawings Fig. 1 is a part sectional elevation of the heater, the burner shown by dotted lines.

Fig. 2 is a partly broken section taken on line 2—2 of Fig. 1.

As is clearly shown in the drawings 1 is the usual lamp burner and 2 is a sheet metal ring which fits in the burner the same as the base ring of an ordinary lamp chimney.

3 is a fine mesh perforated screen of cylindric form, which is removably seated in the ring 2, the upper part of the screen projecting above the top of the burner 1 so as to partly enclose the flames from said burner.

Fixed to the upper edge of ring 2 is an annular flat plate 4 formed with perforations 5, this plate in effect forming an outwardly projecting flange around the upper rim of ring 2. 6 is a part conical or tapered inner shell preferably formed of sheet metal and provided with an observation window 7 through which the lamp flame may be inspected.

The top rim of the tapered shell 6 is contracted or curved inwardly, as shown at 8, and the bottom edge is secured, as by double seaming, to the outer circumference of the annular plate 4.

The outer shell 9 encloses the shell 6, as shown in Fig. 1. This shell 9 is provided at suitable intervals around its circumference and near its top and bottom with inwardly projecting lugs 10 which are preferably formed by cutting a substantially semi-circular slit in the wall of shell 9 and bending the severed part to form an inwardly projecting integral lug 10. The inner ends of lugs 10 rest against the shell 6 to hold the outer shell 9 in proper position with respect to the inner shell 6.

The openings thus formed in the shell communicate with the space between the two shells and improve the circulation between them.

The outer shell is formed with an outwardly projecting lug 11, to which is secured a suitable handle 12 by means of bolts 13, the handle 12 being also riveted or otherwise secured to the annular plate 4, as shown in the drawings.

By removing the bolt 13 the outer shell 9 can be removed. When this shell is in place, as shown, the bolt 13 tightly clamps the shell 9 to handle 12 and to the tapered inner shell 6.

When burner 1 is lighted it takes air through its perforated lower part as is usual in kerosene lamps, but when the heating attachment is applied to the burner by inserting the ring 2, as shown in Fig. 1, a small additional amount of air is admitted through the perforations 5 of the annular plate 4. Some of the air so admitted rises in the inner shell 6 and the remainder, carrying an additional supply of oxygen, passes through the perforations of screen 3 and thereby increases the effectiveness of combustion of the flames. Adding this extra supply of air would, without screen 3, cause flickering and uneven burning of the flames, but with the screen in place the velocity of the air striking the flames is reduced so that no flickering takes place, even though the lamp be subjected to strong gusts of wind.

Heated air rises within the inner shell 6 and previous to its escape through the top the current of hot air is contracted by the deflecting top 8, as shown by the arrow in Fig. 1, thereby increasing the draft and preventing down currents of cold air in the inner shell 6.

The space between the inner and outer shells is an air circulating and heating space and prevents overheating the wall 6 of the inner shell. It also induces a strong circulation of warm air up through the annular space between the shells.

By the means above described I have produced a simple and relatively inexpensive heating device that can be applied to an ordinary kerosene lamp, either of the one burner or multiple burner type. It quickly converts a lamp from an illuminating device into an effective heating apparatus that can be used for either indoor or outdoor cooking, or for any like purposes.

Having thus described my invention, what I claim and desire to secure by Letters Patent is:

In combination, a lamp burner and a heating device comprising an annular ring, a perforated cylindrical screen removably seated in said ring and projecting above the top of said burner, a tapered inner shell having its top edge contracted and its bottom edge surrounding said screen and spaced apart therefrom, an annular perforated plate secured to the upper end of said ring and to the bottom edge of said inner shell, a tapered outer shell formed near its top and bottom with inwardly projecting integral lugs taking against said inner shell, said outer shell also formed with a projecting lug and a handle removably secured to said lug and also secured to said annular plate, for the purposes set forth.

In testimony whereof, I affix my signature.

BRUNO MARTIN.